United States Patent [19]

Guglielmo, Sr.

[11] Patent Number: 4,748,188

[45] Date of Patent: * May 31, 1988

[54] PROCESS FOR TREATING WOOD PRODUCTS WITH AN ANTIFOULING/PRESERVATIVE COMPOSITION

[76] Inventor: Richard J. Guglielmo, Sr., Lambs La., Cresskill, N.J. 07626

[*] Notice: The portion of the term of this patent subsequent to Nov. 26, 2002 has been disclaimed.

[21] Appl. No.: 760,280

[22] Filed: Jul. 29, 1985

Related U.S. Application Data

[60] Division of Ser. No. 508,521, Jun. 27, 1983, Pat. No. 4,555,356, which is a continuation-in-part of Ser. No. 888,373, Mar. 20, 1978, Pat. No. 4,393,102, and a continuation-in-part of Ser. No. 341,275, Jan. 21, 1982, abandoned.

[51] Int. Cl.$^4$ ............................................. C09D 5/14
[52] U.S. Cl. .................................. 514/493; 106/15.05; 252/400.1
[58] Field of Search ................. 106/15.05; 252/400 R; 514/493

[56] References Cited

U.S. PATENT DOCUMENTS

| | | | |
|---|---|---|---|
| 2,580,473 | 1/1952 | Sowa et al. | 524/99 |
| 2,593,267 | 4/1952 | Church et al. | 252/400.51 |
| 3,214,453 | 10/1965 | Stern, Jr. | 106/18 |
| 3,222,158 | 12/1965 | Sowa | 514/493 |
| 3,284,157 | 11/1966 | Peters | 427/317 |
| 3,480,712 | 11/1969 | Thompson | 424/245 |
| 3,684,752 | 8/1972 | Goto et al. | 106/18 |
| 3,925,246 | 12/1975 | Coates et al. | 252/400.51 |
| 3,991,124 | 11/1976 | Schellenbaum | 106/38.22 |
| 4,010,141 | 3/1977 | Onozuka et al. | 424/78 |
| 4,012,347 | 3/1977 | Gitlitz et al. | 514/493 |
| 4,039,494 | 8/1977 | Drisko | 106/18 |
| 4,179,536 | 12/1979 | Kasamatsu et al. | 514/493 |
| 4,185,094 | 1/1980 | Crump | 514/493 |
| 4,220,688 | 9/1980 | Mitchell et al. | 106/15.05 |
| 4,260,535 | 4/1981 | Russell | 106/15.05 |
| 4,303,726 | 12/1981 | Turner | 106/15.05 |
| 4,314,850 | 2/1982 | Watanabe et al. | 106/15.05 |
| 4,389,460 | 6/1983 | Dawans et al. | 106/15.05 |
| 4,547,366 | 10/1985 | Marx | 424/78 |
| 4,554,092 | 11/1985 | Guglielmo, Sr. | 252/400 R |
| 4,555,356 | 11/1985 | Guglielmo, Sr. | 252/400 R |

FOREIGN PATENT DOCUMENTS

| | | |
|---|---|---|
| 2355451 | 10/1980 | France . |
| 163510 | 10/1982 | Japan . |
| 159302 | 10/1984 | Japan . |
| 89004 | 5/1986 | Japan . |

OTHER PUBLICATIONS

Hosoda et al, Chemical Abstracts, 26704q, vol. 73, 1970, p. 64.

Primary Examiner—Paul Lieberman
Assistant Examiner—Willie J. Thompson
Attorney, Agent, or Firm—Louis E. Marn

[57] ABSTRACT

There is disclosed a wood preservative system of from 2 to 15 percent preferably 8 to 12 percent by weight of a tributyl tin ester selected from the group consisting of tri-n-butyltin linoleate, Bis(tri-n-butyl)tin succinate, tri-n-butyl tin benzoate, tri-n-butyl tin salicylate and mixtures thereof, in an organic solvent system or a water base system, preferably a water base system, for controlling algae, fungi, shipworms, gribbles, barnacles and other wood deteriorating organisms and the like from attacking a wood substrate.

3 Claims, 1 Drawing Sheet

PROCESS FOR TREATING WOOD PRODUCTS WITH AN ANTIFOULING/PRESERVATIVE COMPOSITION

FIELD OF THE INVENTION

This is a division of application Ser. No. 508,521, filed June 27, 1983, now U.S. Pat. No. 4,555,356, which is a continuation-in-part of U.S. application Ser. Nos. 888,373 now U.S. Pat. No. 4,393,102 and 341,275, now abandoned, filed Mar. 20, 1978 and Jan. 21, 1982, respectively. This invention relates to a composition of matter and a process for using same, and more particularly to a preservative for treating wood, and in particular, lobster and crab traps, wood hulls, wood pilings and the like.

BACKGROUND OF THE INVENTION

It has been found that wood exposed to sea and lake water, experience heavy levels of fouling and deterioration due to algae, fungi, shipworms, gribbles, barnacles and other wood deteriorating organisms. Accordingly, this limits the expected life of wood products exposed to such conditions. Therefore, preservative compounds have been used for centuries with only partial success.

Antifouling chemicals, such as copper compounds, mercurial compounds and pentachloraphenol are presently in wide use. However, due to high human toxicity and also suspect carcinogenic properties, the use of these chemicals as antifouling or preservative chemicals has been limited or greatly curtailed.

Bis(tri-n-butyl)tin Oxides (TBTO) have been used to replace the above chemicals because of their effectiveness against algae, fungi, shipworms, gribbles, barnacles and other wood deteriorating organisms. TBTO has a relatively low toxicity factor as it pertains to humans. However, a major drawback to the use of TBTO is its volatility (vaporization) and its chemical instability, that is, TBTO breaks down to di and/or monobutyl tin compounds which diminishes its capacity as an antifouling or preservative agent.

OBJECTS OF THE INVENTION

An object of the present invention is to provide a wood preservative composition exhibiting substantial efficacy over extended periods of time after application.

Another object of the present invention is to provide a wood preservative composition readily applied to a wood substrate.

Still another object of the present invention is to provide a wood preservative composition which is relatively non-toxic to man during its application.

Yet another object of the present invention is to provide a wood preservative composition not readily leached out of the wood substrate.

A further object of the present invention is to provide a wood preservative composition capable of penetrating wood by use of simple methods, such as dipping, brushing and spraying.

Another object of the present invention is to provide a wood preservative composition capable of providing protection without need for pressurizing method of treatment.

Still another object of the present invention is to provide a wood preservative composition which after treatment wood can be painted or coated.

Yet another object of the present invention is to provide a wood preservative composition which after treatment acts as paint primer; linoleate ester particularly acts as long chain fatty acid.

Still yet another object of the present invention is to provide a wood preservative composition to enhance the application of fiberglass polyester to a surface.

SUMMARY OF THE INVENTION

These and other objects of the present invention are achieved by the use in a wood preservative system of from 2 to 15 percent, preferably 8 to 12 percent by weight of a tributyl tin ester selected from the group consisting of tri-n-butyltin linoleate, bis(tri-n-butyl)tin succinate, tri-n-butyl tin benzoate, tri-n-butyl tin salicylate and mixtures thereof, in an organic solvent system or a water base system, preferably a water base system, for controlling algae, fungi, shipworms, gribbles, barnacles and other wood deteriorating organisms and the like from attacking a wood substrate.

BRIEF DESCRIPTION OF THE DRAWINGS

An understanding of the invention will be faciliated by reference to the photographs on the drawing and the accompanying detailed description; wherein.

DETAILED DESCRIPTION OF THE INVENTION

Figure 2:
FIG. 2 is a photograph of a untreated lobster trap.

It has been found that tri-n-butyl tin esters can be used to replace existing treatment chemicals, such as copper, mercurial compounds, pentachlorophenol and tri-n-butyl tin oxides. This is extremely important since these esters are considerably less toxic to man, and are found to be extremely stable and heat resistant and have a low volatility. They also have low water solubility which keeps the deposited tin ester in the substrate, and there is enough water solubility to produce excellent effectiveness against the organisms being controlled. Each tin ester has different water solubility for instance tri-n-butyl tin lineolate is considerably less water soluble than tri-n-butyl tin salicylate, depending on the application and rate of leaching. Many combinations are possible or each ester on its own can be used. The tin ester is the basic active ingredient.

The tri-n-butyl tin esters used in the present invention are selected from the group consisting of tri-n-butyl tin linoleate, bis(tri-n-butyl)tin succinate, tri-n-butyl tin benzoate, tri-n-butyl tin salicylate and mixtures thereof, with the tri-n-butyl tin lineolate being the preferable ester in the organic base system and tri-n-butyl tin salicylate preferred in the water base system. The tri-n-butyl tin ester is readily incorporated into a paint and/or plastic type formulation (organic solvents), or can also be mixed with water. The amounts of ester added are in an amount of from 2 to 15, preferably 8 to 12 percent by weight for the concentrate to either the organic solvent system or a water base system, preferably the water base system.

The essential components of a preservative concentrate system for use in a organic solvent base system are the tri-n-butyl tin esters selected from the group consisting of tri-n-butyl tin linoleate, bis(tri-n-butyl)tin succinate, tri-n-butyl tin benzoate, tri-n-butyl tin salicylate and mixtures thereof, with the tri-n-butyl tin esters being admixed with an aromatic hydrocarbon to form the wood preservative concentrate. Prior to application, the wood preservative concentrate is diluted with an organic solvent, such as mineral spirits or crude oil in a ratio of from about 4 to about 1, with a preferable ratio being 3 parts of organic solvent to 1 part of concentrate.

The essential components of the preservative concentrate system for use in a water base solvent system are tri-n-butyl tin esters selected from the group consisting of tri-n-butyl tin linoleate, bis(tri-n-butyl)tin succinate, tri-n-butyl tin benzoate, tri-n-butyl tin salicylate and mixtures thereof with the tri-n-butyl tin esters being admixed with coupling agents or emulsifying agents. Examples of coupling agents suitable with the present invention are: ethanol, isopropanol, methanol and diacetone alcohol. Examples of emulsifying agents suitable with the present invention are 9 molar ethylene oxide and ethoxylate. The addition of the coupling or emulsifying agents permits the tri-n-butyl tin esters with low water solubility to be admixed with water for application rather than utilizing a conventional organic solvent base. Prior to application, this wood preservative concentrate is diluted in water in a ratio of from about 1 to 2 oz. to 128 ozs. of water, preferably approximately 2 to 8 oz. to 128 oz. of water.

A method of application of the wood preservative system of the present invention is achieved by painting the wood substrate, such as a boat hull, pilings or the like with the mixture of wood preservative concentrate in a solvent system, or by dipping the wood substrate, such as lobster or crab traps, in a tank containing the wood preservative concentrate in a solvent system. When the wood substrate is dipped in a tank containing the wood preservative concentrate in a solvent system, it should be allowed to set in the tank from about 10 seconds to about 180 seconds. . Dipping time is dependent on the hardness of the wood treated, wherein softer woods, such as pine, require less immersion time and harder woods, such as oak, require more immersion time in the wood preservative system.

Although the wood substrate treated with the wood preservative concentrate in a solvent system can be utilized when it becomes dry to the touch it is preferable that the wood preservative concentrate be allowed to cure. The purpose of curing allows for the vaporization or evaporation of the solvent system and the absorbtion of the wood preservative concentrate into the wood substrate. The wood preservative concentrate should be allowed to cure from about 24 to 72 hours, with a preferable curing time of 48 hours prior to use.

Figure 1:
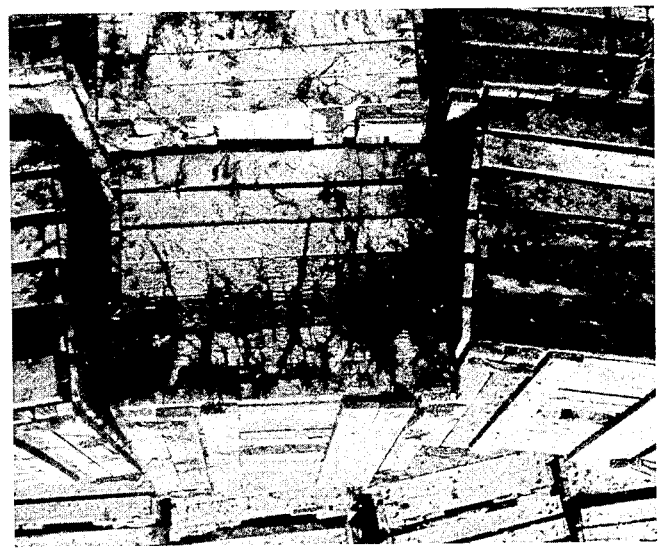
FIG. 1 is a photograph of a lobster trap treated with the present invention.

It has been found that wood treated with the wood preservative system of the present invention results in the active ingredient, tri-n-butyl tin ester, not readily leaching out and effective in protecting the substrate from attack by algae, fungi, shipworms, gribbles, barnacles and other wood deteriorating organisms. Referring to FIGS. 1 and 2, there are shown photographs of treated and untreated lobster traps with the wood preservative concentrate demonstrating the efficacy of the present invention. Such efficacy has been repeatedly demonstrated whether in the fresh waters of the Great Lakes Region or the salt water of the Florida Keys, the Gulf, Cape Hatteras, Nova Scotia and the like.

EXAMPLE OF THE INVENTION

The following examples are illustrative of the present invention:

EXAMPLE I

In preparation for treating a lobster trap with a wood preservative system of the present invention a wood preservative concentrate of the following components is formulated as set forth in Table I

TABLE I

| COMPONENT | PARTS |
|---|---|
| Metrosol 100 (Aromatic Hydrocarbon) | 90.00 |
| tri-n-butyl tin linoleate | 10.00 |
| | 100.00 |

Such wood preservative concentrate is then admixed with mineral spirits in a ratio of 3 parts of mineral spirits to 1 part of concentrate.

The lobster trap to be treated is dipped in a tank containing the wood preservative system and is allowed to remain there for up to 3 minutes. The lobster trap is then removed and allowed to cure for 48 hours prior to usage. A lobster trap coated with the above referenced wood preservative, and a control untreated lobster trap were placed on the ocean floor for a period of 18 weeks off the coast of Marathon, Fla.

Referring now to FIG. 1, there is shown a photograph of the lobster trap treated with the wood preservative system of the present invention after it was removed from the sea floor. The thus treated lobster trap was found to be substantially free of barnacles and sea worms, and there appeared to be no deterioration of the wood.

Referring now to FIG. 2, there is shown a photograph of the control lobster trap after its removal from the sea floor. As can be seen from the photograph, the untreated lobster trap had been heavily attacked by marine organisms.

EXAMPLE II

The following wood preservative concentrate is formulated for a water reducible system:

TABLE II

| COMPONENT | PARTS |
|---|---|
| tri-n-butyl tin salicylate | 11.00 |
| Isopropyl Alcohol - 99% Pure | 37.00 |
| Triton N101 | 52.00 |
| Nonyl Phenol Polyethylene Oxide | 100.00 |

Dependent on the amount of wood preservative needed, two ounces of the concentrate is admixed with one gallon of water to formulate a water base wood preservative system.

Additionally, this water soluable treatment can be used to treat green fresh cut wood to prevent algae growth during storage or shipping.

While the invention has been described in connection with the exemplary embodiments thereof, it will be understood that many modifications will be apparent to those of ordinary skill in the art and that this application is intended to cover any adaptions or variations thereof. Therefore, it is manifestly intended that this invention be only limited by the claims and the equivalents thereof.

What is claimed:

1. A process for treating a wood product to impart antifouling and preservative properties thereto which comprises contacting said wood product with an antifouling/preservative composition comprised of tri-n-butyl tin linoleate in an amount of from 8 to 12 percent by weight in a solvent system to form a treated wood product of controlled leach out rate of said tri-n-butyl tin linoleate in a water environment.

2. The process as defined in claim 1 wherein said solvent system is an organic base solvent system.

3. The process as defined in claim 1 wherein said solvent system is a water base solvent system.

* * * * *